United States Patent
Muraoka

(10) Patent No.: US 11,012,168 B2
(45) Date of Patent: May 18, 2021

(54) APPARATUS, METHOD AND NON-TRANSITORY COMPUTER READABLE MEDIUM STORING PROGRAM, FOR WIRELESS COMMUNICATION

(71) Applicant: NEC Corporation, Tokyo (JP)

(72) Inventor: Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 86 days.

(21) Appl. No.: 16/472,935

(22) PCT Filed: Aug. 16, 2017

(86) PCT No.: PCT/JP2017/029427
§ 371 (c)(1),
(2) Date: Jun. 24, 2019

(87) PCT Pub. No.: WO2018/123127
PCT Pub. Date: Jul. 5, 2018

(65) Prior Publication Data
US 2019/0356400 A1    Nov. 21, 2019

(30) Foreign Application Priority Data
Dec. 27, 2016  (JP) ............................ JP2016-252660

(51) Int. Cl.
*H04B 17/318* (2015.01)
*H04W 8/00* (2009.01)
(Continued)

(52) U.S. Cl.
CPC .......... *H04B 17/318* (2015.01); *H04W 8/005* (2013.01); *H04W 52/242* (2013.01);
(Continued)

(58) Field of Classification Search
CPC ............. H04W 52/242; H04W 52/367; H04W 52/383; H04W 8/005; H04W 88/02; H04W 92/18; H04W 76/14; H04B 17/318
See application file for complete search history.

(56) References Cited

U.S. PATENT DOCUMENTS

2014/0185529 A1\* 7/2014 Lim ...................... H04W 8/005
370/328
2014/0328329 A1\* 11/2014 Novlan ............... H04W 56/002
370/336
(Continued)

FOREIGN PATENT DOCUMENTS

| JP | 2013-34165 A | 2/2013 |
|---|---|---|
| JP | 2014-153209 A | 8/2014 |
| WO | 2015/059834 A1 | 4/2015 |

OTHER PUBLICATIONS

International Search Report issued on International Application No. PCT/JP2017/029427, dated Oct. 31, 2017.
(Continued)

*Primary Examiner* — Ricardo H Castaneyra

(57) ABSTRACT

A wireless terminal (1) includes at least one memory (706), at least one processor coupled to the at least one memory (706); and an RF transceiver (701) capable of performing device-to-device (D2D) communication. The wireless terminal (1) receives a discovery signal transmitted from another wireless terminal (1) by using the RF transceiver (701), estimates a transmission power value of a transmission terminal of the discovery signal in accordance with a type of the discovery signal, and determines an inter-terminal path loss between the wireless terminals by using the estimated transmission power value and the received power value of the discovery signal. In this way, the inter-terminal path loss is estimated without the need for receiving notification regarding a transmission power value from a (Continued)

base station (2) to the terminal (1) when ProSe direct discovery is used.

9 Claims, 7 Drawing Sheets

(51) Int. Cl.
| | |
|---|---|
| *H04W 52/36* | (2009.01) |
| *H04W 76/14* | (2018.01) |
| *H04W 52/24* | (2009.01) |
| *H04W 88/02* | (2009.01) |
| *H04W 92/18* | (2009.01) |

(52) U.S. Cl.
CPC ......... *H04W 52/367* (2013.01); *H04W 76/14* (2018.02); *H04W 88/02* (2013.01); *H04W 92/18* (2013.01)

(56) References Cited

U.S. PATENT DOCUMENTS

| | | | | |
|---|---|---|---|---|
| 2015/0358802 | A1* | 12/2015 | Nagata | H04W 52/0261 370/329 |
| 2016/0057794 | A1* | 2/2016 | Morita | H04W 76/14 370/329 |
| 2016/0142898 | A1* | 5/2016 | Poitau | H04W 76/14 370/329 |
| 2017/0006452 | A1* | 1/2017 | Ponnuswamy | H04L 5/0035 |

OTHER PUBLICATIONS

3GPP Organizational Partners, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0, Jun. 2016, Valbonne, France, pp. 1-310 (310 pages total).

3GPP Organizational Partners, "3rd Generation Partnership Project; Technical Specification Group Services and System Aspects; Proximity-based services (ProSe); Stage 2(Release13)", 3GPP TS 23.303 V13.4.0, Jun. 2016, Valbonne, France, pp. 1-124 (124 pages total).

3GPP Organizational Partners, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, Valbonne, France, pp. 1-623 (623 pages total).

3GPP Organizational Partners, "3rd Generation Partnership Project; Technical Specification Group Radio Access Network; Evolved Universal Terrestrial Radio Access (E-UTRA); Physical layer procedures (Release 13)", 3GPP TS 36.213 V13.1.1, Mar. 2016, Valbonne, France, pp. 1-361 (361 pages total).

Taichi Ohtsuji et al., "Device-to-Device Relay Selection based on Effective Path Throughput to Fill Coverage Holes in Public Safety LTE", IEICE Technical Report, Nov. 24-25, 2016, vol. 116, No. 318, pp. 11-16 (8 pages total).

Written Opinion issued on International Application No. PCT/JP2017/029427, dated Oct. 31, 2017.

* cited by examiner

APPARATUS, METHOD AND NON-TRANSITORY COMPUTER READABLE MEDIUM STORING PROGRAM, FOR WIRELESS COMMUNICATION

This application is a National Stage Entry of PCT/JP2017/029427 filed on Aug. 16, 2017, which claims priority from Japanese Patent Application 2016-252660 filed on Dec. 27, 2016, the contents of all of which are incorporated herein by reference, in their entirety.

TECHNICAL FIELD

The present disclosure relates to inter-terminal direct communication (device-to-device (D2D) communication) and, in particular, to transmission power control of D2D communication.

BACKGROUND ART

A type of communication in which a wireless terminal directly communicates with another wireless terminal not via an infrastructure network such as a base station is referred to as device-to-device (D2D) communication. The D2D communication includes at least one of Direct Communication and Direct Discovery. In some implementations, a plurality of wireless terminals supporting D2D communication form a D2D communication group autonomously or according to instructions of a network, and communicate with another wireless terminal in the formed D2D communication group.

Proximity-based services (ProSe) specified in 3GPP Release 12 and Release 13 are examples of the D2D communication. ProSe direct discovery is performed through a procedure in which a wireless terminal capable of performing ProSe (i.e., ProSe-enabled User Equipment (UE)) discovers another ProSe-enabled UE only by using the capability of a radio communication technology (e.g., Evolved Universal Terrestrial Radio Access (E-UTRA) technology) of those two UEs. ProSe direct discovery may be performed by three or more ProSe-enabled UEs.

There are models A and B for ProSe direct discovery. In the model A, an announcing UE broadcasts predetermined information, while a monitoring UE attempts to receive the predetermined information. The monitoring UE finds the announcing UE by receiving the predetermined information or discovery signal from the announcing UE. In contrast, in the model B, a discoverer UE sends a request or solicitation containing predetermined information and a discoveree UE receives this request or solicitation message and then replies with a response message associated with the request. That is the discovery in the model A is achieved only by unidirectional transmission from one UE to another UE, while the discovery in the model B is achieved by bidirectional transmissions between UEs. The model A is also referred to as an announcement model, while the model B is also referred to as a solicitation/response model.

ProSe direct communication makes it possible, for example, to establish a communication path(s) between two or more ProSe-enabled UEs existing in a direct communication range after the ProSe direct discovery procedure is performed. Stated differently, ProSe direct communication enables a ProSe-enabled UE to directly communicate with another ProSe-enabled UE without going through a Public Land Mobile Network (PLMN)) including a base station (eNodeB (eNB)). ProSe direct communication may be performed by using a radio communication technology (i.e., E-UTRA technology) that is also used to access an eNB or by using a Wireless Local Area Network (WLAN) radio technology (i.e., IEEE 802.11 radio technology).

In 3GPP Release 12 and Release 13, a radio link between terminals (i.e., UEs) used for direct communication or direct discovery is referred to as Sidelink. Sidelink transmission uses the Long Term Evolution (LTE) frame structure defined for uplink and downlink and uses a subset of uplink resources in frequency and time domains. A wireless terminal (i.e., UE) performs sidelink transmission by using Single Carrier FDMA (Frequency Division Multiple Access) (SC-FDMA), which is the same as used in uplink.

In 3GPP ProSe, allocation of radio resources to a UE for sidelink transmission is performed by a radio access network (e.g., Evolved Universal Terrestrial Radio Access Network (E-UTRAN)). A UE that has been permitted to perform sidelink communication by a ProSe function performs ProSe Direct Discovery or ProSe direct communication by using radio resources allocated by a radio access network node (e.g., eNodeB (eNB)).

Regarding ProSe direct discovery, two resource allocation modes, i.e., autonomous resource selection and scheduled resource allocation are specified. The autonomous resource selection and the scheduled resource allocation are referred to as "sidelink discovery Type 1" and "sidelink discovery Type 2", respectively.

In the autonomous resource selection for ProSe direct discovery (i.e., sidelink discovery Type 1), a UE that desires transmission (announcing) of a discovery signal (i.e., Physical Sidelink Shared Channel (PSDCH)) autonomously selects radio resources from a resource pool.

In the scheduled resource allocation for ProSe direct discovery (i.e., sidelink discovery Type 2), a UE requests an eNodeB to allocate resources for announcement via RRC signaling. The eNodeB allocates resources for announcement selected from a resource pool to the UE. When the scheduled resource allocation is used, the eNodeB indicates in a System Information Block (SIB 19) that it provides resources for monitoring of ProSe direct discovery but does not provide resources for announcement.

A resource pool for ProSe direct discovery is referred to as a discovery resource pool and is configured in UEs by an eNB via broadcast (SIB 19) or dedicated signaling (RRC signaling). The discovery resource pool consists of $L_{PSDCH}$ subframes and $M^{PSDCH\_RP}{}_{RB}$ frequency domain resource blocks in a discovery period. The discovery period is also referred to as a PSDCH period.

Regarding the sidelink discovery Type 2, though two types, i.e., Type 2A and Type 2B had been discussed, only Type 2B is specified in the current Release 12 and Release 13. In Type 2B, an eNB allocates radio resources for transmission of a discovery signal (PSDCH) to a UE in a semi-persistent manner. In contrast to this, in Type 2A an eNB allocates radio resources for transmission of a discovery signal (PSDCH) dynamically to a UE in each discovery period (i.e., PSDCH period), which is not specified in the current 3GPP Release 12 and Release 13.

As for ProSe direct communication, two resource allocation modes, i.e., scheduled resource allocation and autonomous resource selection, are specified. The scheduled resource allocation and the autonomous resource selection are referred to as "sidelink transmission mode 1" and "sidelink transmission mode 2", respectively.

In the scheduled resource allocation for ProSe direct communication, when a UE desires to perform sidelink transmission, this UE requests an eNB to allocate radio resources for sidelink transmission, and the eNB allocates resources for sidelink control and data to the UE. To be specific, a UE transmits to an eNB a scheduling request to request an uplink (UL) data transmission resource (i.e., Uplink Shared Channel (UL-SCH) resource) and then transmits a Sidelink Buffer Status Report (Sidelink BSR) to the eNB by using an UL data transmission resource allocated by an uplink grant (UL grant). The eNB determines sidelink transmission resources to be allocated to the UE based on the Sidelink BSR and transmits a sidelink grant (SL grant) to the UE.

The SL grant is defined as Downlink Control Information (DCI) format 5. The SL grant (i.e., DCI format 5) contains contents such as a Resource for PSCCH, Resource block assignment and hopping allocation, and a time resource pattern index. The Resource for PSCCH indicates radio resources for a sidelink control channel (i.e., Physical Sidelink Control Channel (PSCCH)). The Resource block assignment and hopping allocation is used to determine frequency resources, i.e., a set of subcarriers (resource blocks), for transmitting a sidelink data channel (i.e., Physical Sidelink Shared Channel (PSSCH)) for sidelink data transmission. The Time resource pattern index is used to determine time resources, i.e., a set of subframes, for transmitting the PSSCH. Note that, strictly speaking, the resource block means time-frequency resources in LTE and LTE-Advanced and is a unit of resources specified by consecutive OFDM (or SC-FDMA) symbols in the time domain and consecutive subcarriers in the frequency domain. In the case of Normal cyclic prefix, one resource block includes 12 consecutive OFDM (or SC-FDMA) symbols in the time domain and 12 subcarriers in the frequency domain. That is, the Resource block assignment and hopping allocation and the Time resource pattern index designate a resource block for transmitting the PSSCH. The UE (i.e., a sidelink transmitting terminal) determines a PSCCH resource and a PSSCH resource according to the SL grant.

On the other hand, in the autonomous resource selection for ProSe direct communication, a UE autonomously selects resources for sidelink control (i.e., PSCCH) and data (i.e., PSSCH) from a resource pool(s) set by an eNB. The eNB may allocate a resource pool(s) for the autonomous resource selection to the UE in a System Information Block (SIB) 18. The eNB may allocate a resource pool for the autonomous resource selection to the UE in Radio Resource Control (RRC)_CONNECTED by dedicated RRC signaling. This resource pool may be usable also when the UE is in RRC_IDLE.

Furthermore, 3GPP Release 12 specifies a partial coverage scenario in which one UE is located out of the network coverage and the other UE is located in the network coverage. In the partial coverage scenario, a UE that is out of coverage is referred to as a "remote UE" or "sidelink remote UE", while a UE that is in coverage and acts as a relay between the remote UE and the network is referred to as a "ProSe UE-to-Network Relay" or "sidelink relay UE". The ProSe UE-to-Network Relay relays traffic (downlink and uplink) between the remote UE and the network (i.e., E-UTRAN and Evolved Packet Core (EPC)).

More specifically, the ProSe UE-to-Network Relay attaches to the network as a UE, establishes a PDN connection to communicate with a ProSe function entity or another Packet Data Network (PDN), and communicates with the ProSe function entity to start ProSe direct communication. The ProSe UE-to-Network Relay further performs the discovery procedure with the remote UE, communicates with the remote UE on the inter-UE direct interface (e.g., sidelink or PC5 interface), and relays traffic (downlink and uplink) between the remote UE and the network. When the Internet Protocol version 4 (IPv4) is used, the ProSe UE-to-Network Relay operates as a Dynamic Host Configuration Protocol Version 4 (DHCPv4) Server and Network Address Translation (NAT). When the IPv6 is used, the ProSe UE-to-Network Relay operates as a stateless DHCPv6 Relay Agent. The remote UE can use ProSe direct discovery to find the ProSe UE-to-Network Relay. Such ProSe direct discovery is referred to as ProSe UE-to-Network Relay Discovery.

Note that for ProSe direct discovery, discovery for general applications, Group Member Discovery used for finding the same group of terminals for public safety applications, UE-to-Network Relay Discovery used for finding terminals that can be relay-connected for public safety applications, and Relay discovery additional information that supplies additional information to remote terminals from terminals capable of being relay-connected are defined.

In this specification, a wireless terminal that has D2D communication capability and the relay capability such as the ProSe UE-to-Network Relay (sidelink relay UE) is referred to as a "relay terminal" or a "relay UE". Further, a wireless terminal that receives a relay service provided by the relay UE is referred to as a "remote terminal" or a "remote UE". The remote terminal is also referred to as a relayed terminal.

Further, 3GPP Release 13 includes extensions of ProSe (see, for example, Non-patent Literatures 1 to 3). Non-patent Literature 1 specifies functions and procedures, related to ProSe discovery and ProSe direct communication, supported by ProSe-enabled UEs, a ProSe application server, and a core network including ProSe function, Mobility Management Entity (MME), Home Subscriber Server (HSS), Serving Gateway (S-GW), and Packet Data Network Gateway (P-GW). Non-patent Literature 2 specifies E-UTRAN radio interface protocol architecture for ProSe direct discovery (i.e., sidelink discovery) and ProSe direct communication (i.e., sidelink communication). More specifically, Sections 23.10 and 23.11 of Non-patent Literature 2 specify support of sidelink discovery and sidelink communication. Non-patent Literature 3 specifies RRC protocols for a radio interface between a UE and an E-UTRAN and also specifies enhancements to the RRC protocols to support sidelink discovery and sidelink communication (see, for example, Sections 5.3.10.15 and 5.10).

Further, a transmission power control method for D2D communication is disclosed. Non-Patent Literature 4 discloses a method for determining transmission power based on a path loss between a base station and a wireless terminal as a method for determining transmission power of a discovery signal. Since this method is equivalent to a method for determining transmission power used in an uplink, an interference with the uplink due to transmission of discovery signals can be prevented to the same degree as it is prevented in the method for determining transmission power used in the uplink. On the other hand, there is a possibility that received power becomes very large since received power in a wireless terminal which receives discovery signals is not taken into consideration. Discovery signals received at a large received power has a large In-band emission which is a leakage interference with surrounding resource blocks in the same subframe. Therefore, a large interference with another discovery signal transmitted in the same subframe may be caused.

On the other hand, Patent Literature 1 discloses a method for determining transmission power of D2D communication based on an inter-terminal path loss. In the technique disclosed in Patent Literature 1, a base station first notifies a transmission power value of a synchronization signal transmitted by a wireless terminal at the start of the D2D communication as control information to two wireless terminals which perform the D2D communication. The wireless terminal which starts the D2D communication transmits a synchronization signal by using the transmission power value notified from the base station, and then the wireless terminal which is a communication partner of the D2D communication receives the synchronization signal. When doing so, the wireless terminal which has received the synchronization signal measures received power of the synchronization signal and estimates a path loss value between the wireless terminals from a difference between the measured received power value and the transmission power value of the synchronization signal notified from the base station. The wireless terminal which has received the synchronization signal determines transmission power of a response signal based on the estimated inter-terminal path loss value. Further, when the response signal including the estimated inter-terminal path loss value is transmitted, the wireless terminal which has transmitted the synchronization signal can recognize an inter-terminal path loss. Note that the transmission power of the response signal is determined based on the inter-terminal path loss value. Accordingly, regarding the response signal, received power in a receiving terminal can be controlled to reduce influence of the In-band emission.

CITATION LIST

Patent Literature

Patent Literature 1: Japanese Unexamined Patent Application Publication No. 2013-34165

Non Patent Literature

Non-Patent Literature 1: 3GPP TS 23.303 V13.4.0 (2016-06), "3rd Generation Partnership Project; Technical Specification Group Services and System Aspects; Proximity-based services (ProSe); Stage 2 (Release 13)", June 2016

Non-Patent Literature 2: 3GPP TS 36.300 V13.4.0 (2016-06), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", June 2016

Non-Patent Literature 3: 3GPP TS 36.331 V13.2.0 (2016-06), "3rd Generation Partnership Project; Technical Specification Group Radio Access Network; Evolved Universal Terrestrial Radio Access (E-UTRA); Radio Resource Control (RRC); Protocol specification (Release 13)", June 2016

Non-Patent Literature 4: 3GPP TS 36.213 V13.1.1 (2016-03), "3rd Generation Partnership Project; Technical Specification Group Radio Access Network; Evolved Universal Terrestrial Radio Access (E-UTRA); Physical layer procedure (Release 13)", March 2016

SUMMARY OF INVENTION

Technical Problem

In the technique disclosed in Patent Literature 1, in order to estimate a path loss between two terminals which perform D2D communication, it is necessary for a base station to notify both mobile stations of a transmission power value for a synchronization signal in advance. Accordingly, control signals between the base station and the terminals increase.

One of the objects to be attained by example embodiments disclosed in this specification is to provide an apparatus, a method, and a program that contribute to estimating an inter-terminal path loss without the need for receiving notification regarding a transmission power value from a base station to the terminal when ProSe direct discovery is used.

Solution to Problem

In a first aspect, a wireless terminal includes at least one memory, at least one processor coupled to the at least one memory, and an RF transceiver. The wireless terminal receives a discovery signal transmitted from another wireless terminal by using the RF transceiver, estimates a transmission power estimated value of a transmission terminal of the discovery signal in accordance with a type of the discovery signal, and determines an inter-terminal path loss between the wireless terminals by using the transmission power estimated value and the received power value of the discovery signal.

In a second aspect, a wireless terminal includes at least one memory, at least one processor coupled to the at least one memory, and an RF transceiver. The wireless terminal transmits a discovery request signal of device-to-device (D2D) direct discovery to a first wireless terminal, receives a discovery response signal of the device-to-device (D2D) direct discovery transmitted from the first wireless terminal, and determines an inter-terminal path loss based on a received power difference value between the received power value of the discovery response signal and a target received power value used for transmission power control of the discovery response signal.

In a third aspect, a wireless communication system includes a first wireless terminal and at least one second wireless terminal. The first wireless terminal transmits a discovery signal to the second wireless terminal. The second wireless terminal receives the discovery signal, estimates a transmission power estimated value of the discovery signal in accordance with a message type of the discovery signal, and determines an inter-terminal path loss between the first wireless terminal and the own terminal by using the transmission power estimated value and the received power value of the discovery signal.

In a fourth aspect, a method performed by a wireless terminal includes receiving a discovery signal transmitted from another wireless terminal, estimating a transmission power estimated value of a transmission terminal of the discovery signal in accordance with a type of the discovery signal, and determining an inter-terminal path loss between the wireless terminals by using the transmission power estimated value and the received power value of the discovery signal.

In a fifth aspect, a program includes a set of instructions (or software codes) that, when loaded into a computer, causes the computer to perform a method according to the above-described fourth aspect.

DESCRIPTION OF EMBODIMENTS

Specific example embodiments will be described hereinafter in detail with reference to the drawings. The same or corresponding elements are denoted by the same symbols throughout the drawings, and duplicated explanations are omitted as necessary for the sake of clarity.

Each of the example embodiments described below may be used individually, or two or more of the example embodiments may be appropriately combined with one another. These example embodiments include novel features different from each other. Accordingly, these example embodiments contribute to attaining objects or solving problems different from one another and also contribute to obtaining advantages different from one another.

The following descriptions on the example embodiments mainly focus on specific examples with regard to improvements of ProSe specified in 3GPP Release 12 (LTE-Advanced) and Release 13 (LTE-Advanced Pro). However, these example embodiments are not limited to the LTE-Advanced and LTE-Advanced Pro and these improvements, and may also be applied to D2D communication in other mobile communication networks or systems.

First Example Embodiment

Figure 1:
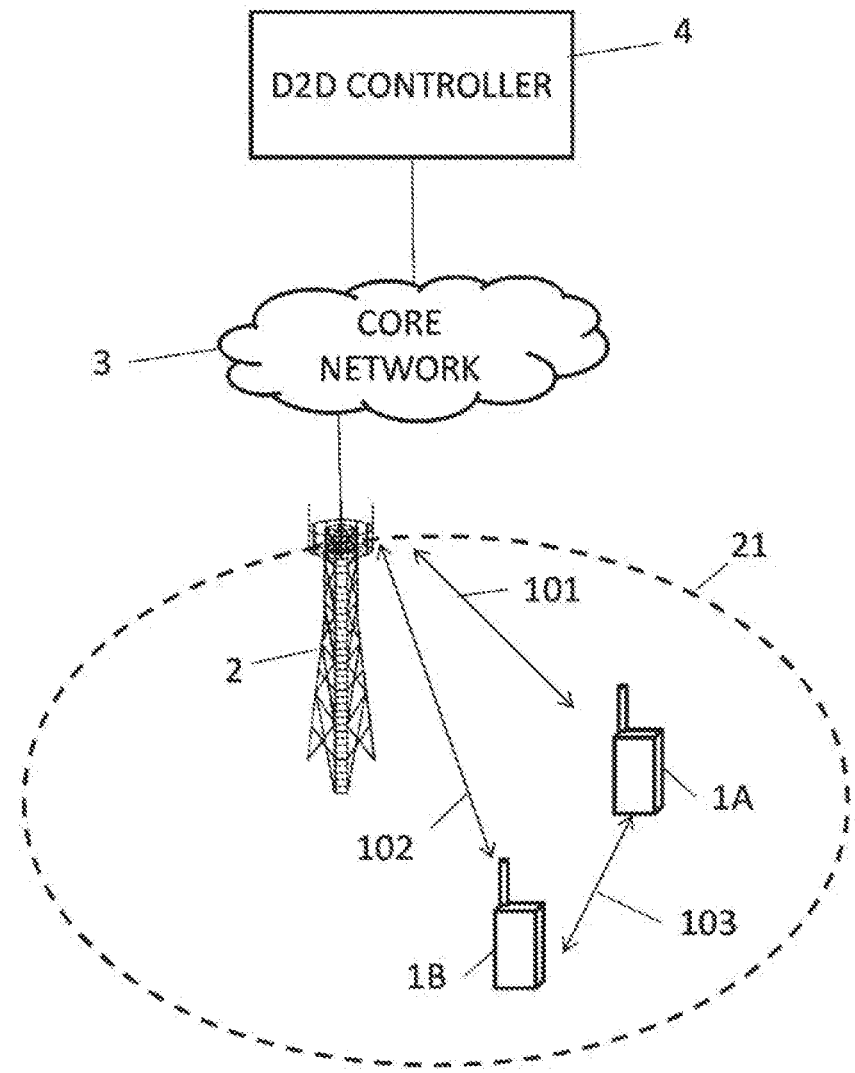
FIG. 1 is a diagram showing a configuration example of a radio communication network according to a first example embodiment.

FIG. 1 shows a configuration example of a radio communication network according to this example embodiment. UEs 1A and 1B each include at least one radio transceiver and are configured to perform cellular communication (101 or 102) with a base station 2 and perform D2D communication on an inter-terminal direct interface (i.e., PC5 interface or sidelink) 103. The D2D communication at least includes direct discovery (i.e., ProSe direct discovery or sidelink discovery) and may further include direct communication (i.e., ProSe direct communication or sidelink communication).

The eNB 2 is an entity located in a radio access network (i.e., E-UTRAN), and it provides cellular coverage 21 containing one or a plurality of cells. The eNB 2 can perform cellular communication (101 and 102) with each of the UEs 1 by using cellular communication technology (i.e., E-UTRA technology).

A core network (i.e., Evolved Packet Core (EPC)) 3 includes a plurality of user plane entities (e.g., S-GW and P-GW) and a plurality of control plane entities (e.g., MME and HSS). The user plane entities relay user data of the UE 1A and the UE 1B between an external network and the radio access network including the eNB 2. The control plane entities perform various types of control for the UEs 1A and 1B, which includes mobility management, session management (bearer management), subscriber information management, and charging management.

In some implementations, the UE 1A and the UE 1B are configured to communicate with a D2D controller 4 through the eNB 2 and the core network 3 to use a proximity-based service (i.e., 3GPP ProSe). In the case of 3GPP ProSe, the D2D controller 4 is equivalent to a ProSe function entity. For example, the UE 1A and the UE 1B may send a request for ProSe direct discovery (i.e., ProSe Direct Discovery Request) to the D2D controller 4, receive authorization for ProSe direct discovery from the D2D controller 4, and also receive configuration information related to ProSe direct discovery from the D2D controller 4. The configuration information related to ProSe direct discovery contains, for example, a ProSe Application Code(s), or a Discovery Filter(s) composed of a ProSe Application Code(s) and a ProSe Application Mask(s), or both.

More specifically, in the case of the model B discovery, a discoverer UE receives a ProSe Query Code and one or more Discovery Response Filters, composed of a ProSe Response Code(s) and a ProSe Application Mask(s), from the D2D controller (ProSe function) 4. The discoverer UE then announces the ProSe Query Code on the PC5 interface (i.e., sidelink) and monitors any ProSe Response Code(s) that matches the one or more Discovery Response Filters on the PC5 interface. Meanwhile, a discoveree UE receives a ProSe Response Code and one or more Discovery Query Filters from the D2D controller (ProSe function) 4. The discoveree UE monitors ProSe Query Codes on the PC5 interface, and when the received ProSe Query Code matches any one of the Discovery Query Filters, announces the ProSe Response Code associated with it on the PC5 interface.

To be more specific, in the case of the model B group member discovery, the discoverer UE transmits a Group Member Discovery Solicitation message (Model B). This Solicitation message contains a Discoverer Info, a Discovery Group ID, and a Target Info. The Discoverer Info provides information about a discoverer user. The Discovery Group ID is an identifier of a discovery group to which a targeted UE should belong. The Target Info provides information about targeted discoverees (single user or group). One or more discoveree UEs that match the value of the Discovery Group ID contained in the received Solicitation message reply to the discoverer UE by using a Group Member Discovery Response message (Model B). This Response message contains a ProSe UE ID, a Discoveree Info, and a Discovery Group ID. The ProSe UE ID is a link layer identifier to be used for subsequent direct one-to-one and one-to-many communication. The Discoveree Info provides information about a discoveree. The Discovery Group ID is an identifier of a discovery group to which the discoveree UE belongs.

In the case of the model B relay discovery (i.e., UE-to-Network Relay Discovery), a remote UE (discoverer) transmits a UE-to-Network Relay Discovery Solicitation message (Model B). This Solicitation message contains a Discoverer Info and a Relay Service Code. The Discoverer Info provides information about a discoverer user. The Relay Service Code is information about connectivity which the discoverer UE is interested in. One or more ProSe UE-to-Network Relays (Discoverees) that match the value of the Relay Service Code contained in the received Solicitation message reply to the remote UE by using a UE-to-Network Relay Discovery Response message (Model B). This Response message contains a ProSe Relay UE ID and a Discoveree Info. The ProSe Relay UE ID is a link layer identifier of a relay UE (i.e., UE-to-Network Relay) that is to be used for direct communication and is associated with the Relay Service Code. The Discoveree Info provides information about a discoveree.

Figure 2A:
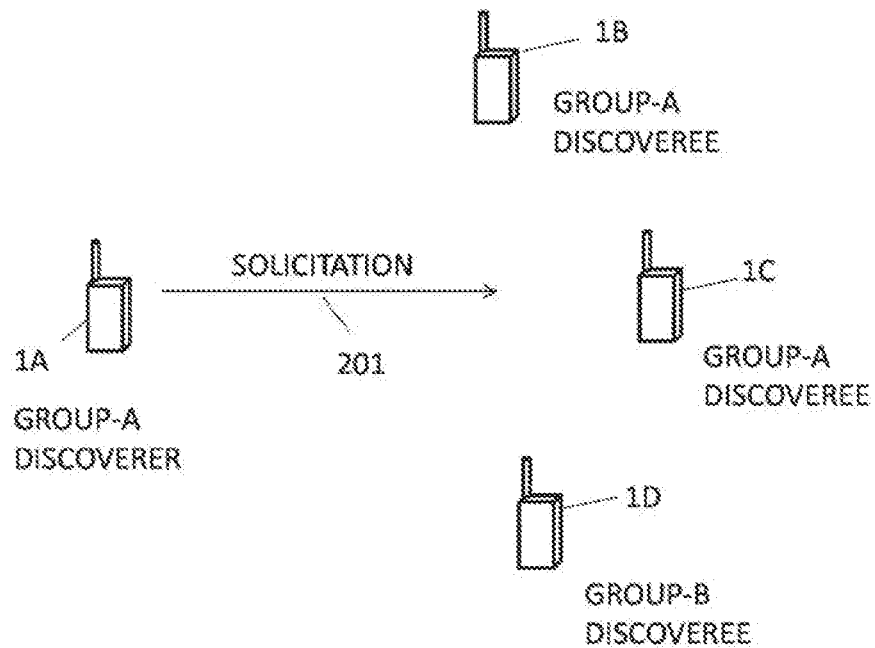
FIG. 2A is a diagram showing transmission of a solicitation message in the direct discovery model B (solicitation/response model)

As is understood from the above description of the model B group member discovery and the model B relay discovery, a plurality of discoveree UEs could transmit response messages to a single solicitation message transmitted from a single discoverer UE. This is specifically described with reference to FIGS. 2A and 2B. FIG. 2A shows that a discoverer UE 1A belonging to or associated with a group A transmits a solicitation message 201. The solicitation message 201 is transmitted in order to find any UE belonging to or associated with the group A. For example, the solicitation message 201 may be a Group Member Discovery Solicitation message (Model B) containing a Discovery Group ID associated with the group A. Note that, the group in this case may be defined by a connectivity service which a UE is interested in. Thus, the "group A" in FIG. 2A may be replaced with the service A. The solicitation message 201 may be a UE-to-Network Relay Discovery Solicitation message (Model B) containing a Relay Service Code associated with the service A.

Figure 2B:
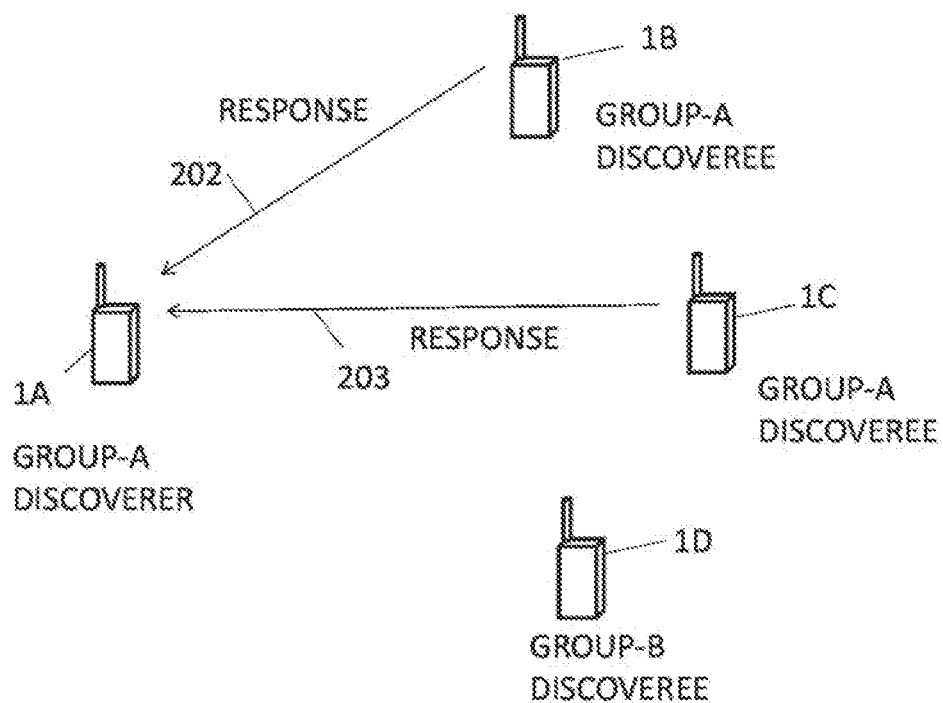
FIG. 2B is a diagram showing transmission of a response message in the direct discovery model B (solicitation/response model)

FIG. 2B shows that discoveree UEs 1B and 1C belonging to or associated with the group A transmit response messages 202 and 203, respectively. A UE 1D receives the solicitation message 201 but does not reply to the discoverer UE 1A because the value of the received Discovery Group ID or Relay Service Code does not match the one it has. The discoveree UEs 1B and 1C could possibly transmit the response messages 202 and 203 substantially at the same time, i.e., in the same sub-frame. Specifically, FIG. 2B shows that many-to-one communication from the discoveree UEs 1B and 1C to one discoverer UE 1A can possibly occur in the ProSe direct discovery model B.

In this example embodiment, regarding ProSe direct discovery, either of the two resource allocation modes, i.e., autonomous resource selection (sidelink discovery Type 1) and scheduled resource allocation (sidelink discovery Type 2) may be applied.

In this example embodiment, the following transmission power $P_{Tx,Sol,1A}$ disclosed in Non-Patent Literature 4 is used as a transmission power value of an UE 1A in the case of a Group Member Discovery Solicitation message (Model B), an UE-to-Network Relay Discovery Solicitation message (Model B) and a discovery signal message of Model A.
[Expression 1]

$$P_{Tx,Sol,1A} = \min\{P_{Max}, 10\log_{10}M + P_O + \alpha \cdot PL_{DL,1A}\} \qquad (1)$$

where $P_{MAX}$ is the maximum transmission power value of the terminal, M is the number of resource blocks, $P_O$ is a target received power, $PL_{DL,1A}$ is a path loss between an eNB 2 estimated by the UE 1A and the UE 1A, and a is a correction coefficient for the path loss which is a value between or equal to 0 and 1. $P_O$ and α are broadcast from the eNB 2 as a system information block by using a broadcast channel. $P_{MAX}$ is specified for each power class of the wireless terminal, and is, for example, 23 dBm in class 3. M is 2 in the case of a discovery signal. Note that $P_O$ and α are parameters related to the discovery signal, and values different from parameters used for uplink communication in which transmission power is determined by using an expression similar to Expression (1) can be set thereto. By determining the transmission power by using Expression (1), a large transmission power is set when a path loss between the eNB 2 and the UE 1A is large, while a small transmission power is set when a path loss between the eNB 2 and the UE 1A is small. As described above, such a transmission power value is not a transmission power value adjusted for a specific UE, and thus it can be said that the transmission power value is a transmission power value of a discovery signal for a non-specific UE.

Figure 3:
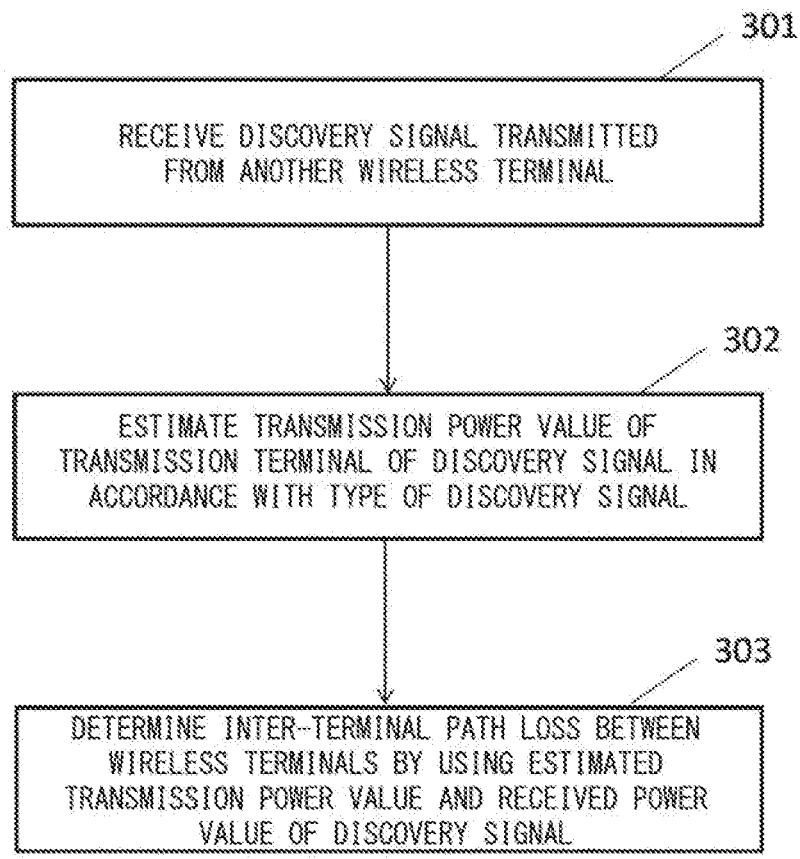
FIG. 3 is a flowchart showing one example of an operation of a terminal according to the first example embodiment.

FIG. 3 is a flowchart showing one example of an operation of a UE 1 according to this example embodiment. In Step 301, the UE 1 receives a discovery signal transmitted from another UE. In Step 302, transmission power of the UE which has transmitted the discovery signal is estimated in accordance with a message type of the received discovery signal. In Step 303, an inter-terminal path loss between the two UEs is determined based on a difference between the estimated transmission power value and the received power value of the discovery signal received by the UE 1.

A method for estimating transmission power in accordance with the message type of the discovery signal in Step 302 is specifically described. First, when the message type of the discovery signal is relay discovery (i.e., UE-to-Network Relay Discovery) for public safety applications, the maximum transmission power value of the terminal is set as a transmission power value of the discovery signal. The maximum transmission power value of the terminal is, for example, 23 dBm (200 mW). Note that in 3GPP, as a power class of the terminal is defined for each frequency band, the maximum transmission power value of the terminal can be determined in accordance with the frequency band which is used. However, in some frequency bands, a plurality of power classes are defined for the terminal (for example, 31 dBm and 23 dBm). In such a case, only one of them (for example, the smaller one) is selected. Alternatively, the maximum transmission power value in accordance with the power class of the terminal is broadcast from the eNB 2 as a system information block related to the discovery signal. This broadcast transmission power value may be used as a transmission power value of the discovery signal. Alternatively, the maximum transmission power value, which is preconfigured to the own terminal and is used when the own terminal is located out of range, may be used as a transmission power value of the discovery signal.

The reason why transmission power of the discovery signal can be estimated by using the maximum transmission power value of the terminal as a transmission power value of the discovery signal when a message type of the discovery signal is relay discovery for public safety applications is described hereinafter. In the case of relay discovery for public safety applications, a UE which transmits the discovery signal is a terminal which is located out of range of the cellular coverage 21 of the eNB 2 or a terminal which requires a relay connection since received power of the radio wave transmitted from the eNB 2 is low. Such a terminal has a large path loss between the eNB 2 and this terminal so that a transmission power value of the discovery signal calculated by using Expression (1) is likely to be a value close to the maximum transmission power value. Accordingly, the UE 1 can estimate a transmission power value of the discovery signal as the maximum transmission power value of the terminal when a message type of the discovery signal is relay discovery for public safety applications.

Another example of the method for estimating transmission power in accordance with the message type in Step 302 may be a relay connection for non-public safety general applications. Regarding relay connection for general applications, for example, a low-power device such as a smart watch does not directly transmit and receive data to and from a distant base station and instead a network could be relay-connected with a smartphone held by a user as a relay terminal. The advantageous effect of this is that for a low-power device, a reduction in power consumption related to transmission can be achieved by communicating with a nearby smartphone instead of a distant base station.

Assume a case in which it is desired that a low-power device find a relay terminal in order to achieve the aforementioned effect. In such a case, it is assumed that the low-power device transmits a discovery signal requesting a relay connection for general applications. In Step 302, when a message type of the discovery signal is relay discovery for general applications as described above, a transmission power value determined by the own terminal (the terminal which has received the discovery signal) based on Expression (1) can be used in place of an estimated value of the transmission power value of the received discovery signal. That is, the transmission power value in accordance with a path loss between the own terminal and a base station is used in place of the estimated value. In other words, a transmission power value of the discovery signal when a specified UE of the own terminal is not a destination is used in place of the estimated value. The reason why a transmission power can be estimated as described above is that it is assumed that a low-power device and a relay terminal are at a very close distance from each other (for example, they are held by the same user). Consequently, a path loss between the low-power device and the base station and a path loss between the relay terminal and the base station would be comparable to each other. Thus, a transmission power value of the discovery signal of the low-power device and a transmission power value of the discovery signal when a specific UE of the own terminal is not a destination are comparable to each other.

Figure 4:
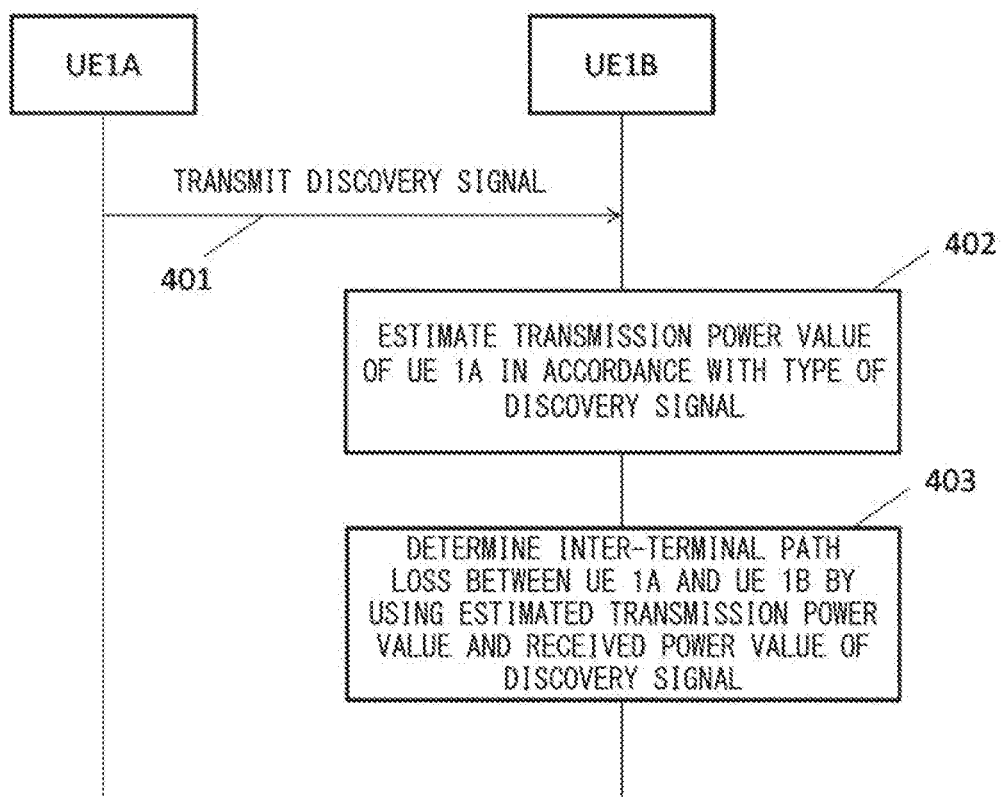
FIG. 4 is a sequence diagram showing one example of a procedure for estimating an inter-terminal path loss at the time of performing direct discovery according to the first example embodiment.

FIG. 4 is a sequence diagram showing one example of a procedure for estimating an inter-terminal path loss at the time of performing direct discovery according to this example embodiment. In Step 401, first, the UE 1A transmits a discovery signal. Note that the UE 1A uses a transmission power value of the discovery signal for a non-specific UE based on Expression (1). Further, this discovery signal may be a request signal of either a discovery signal of the Model A or a discovery signal of the Model B. In Step 402, next, the UE 1B which has received the discovery signal estimates a transmission power value of the UE 1A using the above-described method in accordance with a message type of the discovery signal. In Step 403, a path loss value between the UE 1A and the UE 1B is determined based on a difference value between the estimated transmission power value and the received power value of the discover signal received by the UE 1B.

In the case where the direct discovery model B is used, the UE transmits a discovery response signal after receiving a discovery request signal, and transmission power $P_{Tx,Res,1B}$ according to an estimated value of an inter-terminal path loss is used as a transmission power value of this response signal.

[Expression 2]

$$P_{Tx,Res,1B} = \min\{P_{Max}, 10\log_{10}(M) + P_O' + \alpha' \cdot PL_{SL,1B}\} \quad (2)$$

where $P_O'$ is a target received power (nominal power), $PL_{SL,1B}$ is an estimated value of an inter-terminal path loss estimated by the UE 1B, and $\alpha'$ is a correction coefficient for the path loss which is a value between or equal to 0 and 1. $P_O'$ and $\alpha'$ are broadcast from a base station as parameters for a discovery response signal, and values different from $P_O$ and $\alpha$ which are parameters used for a discovery request signal may be set thereto. M is 2 in the case of a discovery signal. By determining the transmission power by using Expression (2), a large transmission power is set when an inter-terminal path loss is large and a small transmission power is set when an inter-terminal path loss is small. As a result, a terminal which receives a plurality of discovery signals simultaneously can adjust received power of each of the discovery signals to be comparable to each other.

Figure 5:
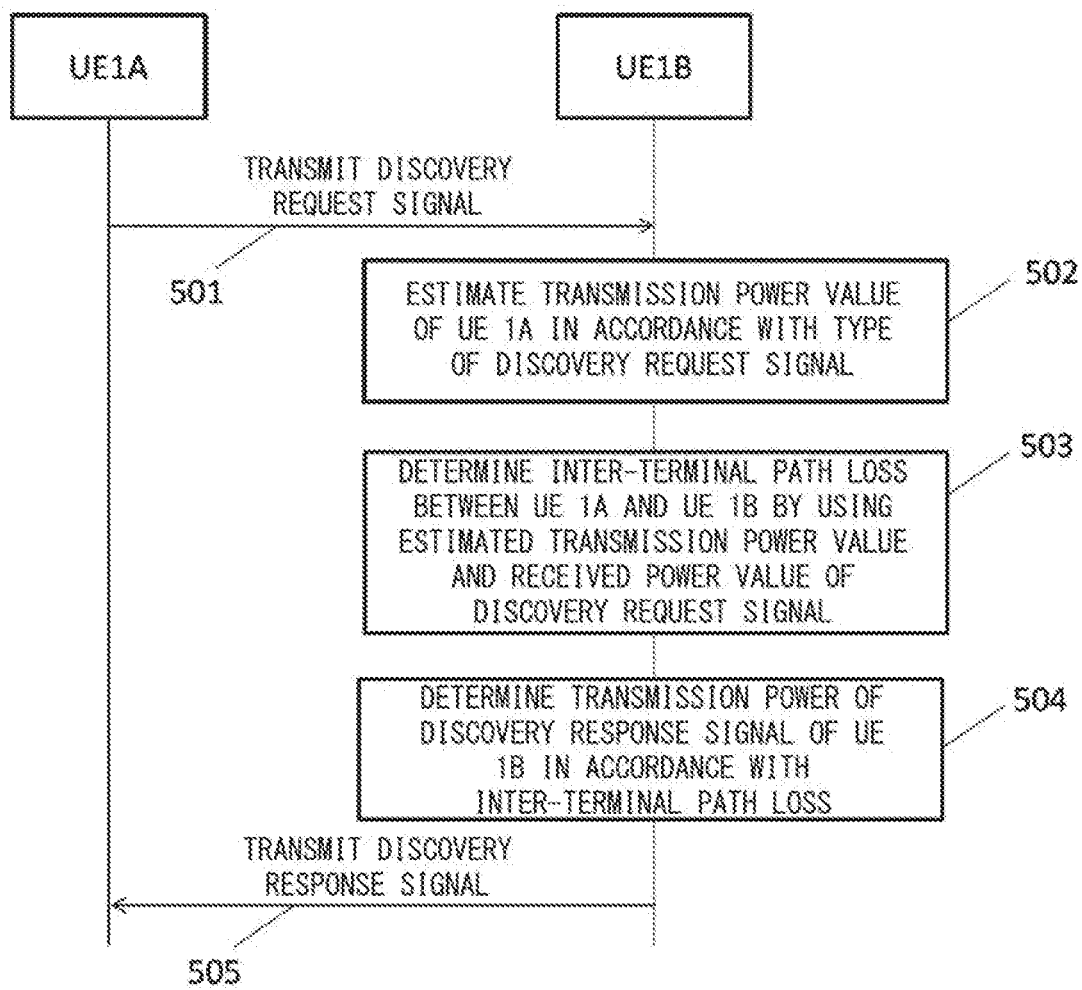
FIG. 5 is a sequence diagram showing one example of a procedure for determining a discovery response signal at the time of performing a direct discovery model B according to the first example embodiment.

FIG. 5 is a sequence diagram showing one example of a procedure for determining a discovery response signal at the time of performing the direct discovery model B. In Step 501, first, the UE 1A transmits a discovery request signal. Note that the UE 1A uses a transmission power value of the discovery signal for a non-specific UE based on Expression (1). In Step 502, next, the UE 1B which has received the discovery request signal estimates a transmission power value of the UE 1A using the above-described method in accordance with a message type of the discovery request signal. In Step 503, an inter-terminal path loss value between the UE 1A and the UE 1B is determined based on a difference value between the estimated transmission power value and the received power value of the discovery request signal received by the UE 1B. In Step 504, the estimated inter-terminal path loss is used to determine a transmission power value of a discovery response signal by using Expression (2). In Step 505, the UE 1B transmits the discovery response signal.

Further, when the UE 1B transmits the discovery response signal by using the transmission power value according to Expression (2), there is a possibility that the transmission power may be higher than that in accordance with the path loss between the UE 1B and the eNB 2. Accordingly, the uplink communication transmitted in the same frequency band as that of the discovery response signal transmitted by the UE 1B may receive interference. Thus, in order to avoid interference with the uplink communication, a transmission power value $P_{TX,Res,1B}$ expressed by Expression (3) can be used.

[Expression 3]

$$P_{Tx,Res,1B} = \min\{P_{Tx,Sol,1B}, 10\log_{10}(M) + P_O' + \alpha' \cdot PL_{SL,1B}\} \quad (3)$$

where $P_{Tx,Sol,1B}$ is a transmission power value in the case where the UE 1B transmits a discovery request signal and is determined by Expression (1) using a path loss value between the UE 1B and the eNB 2. Expression (3) is different from Expression (2) in that transmission power when the UE 1B transmits a discovery request signal is used as an upper limit value of the transmission power value instead of the maximum transmission power value of the terminal. In other words, a transmission power value of the discovery signal for a non-specific UE is used. Accordingly, it is possible to reduce interference with the uplink communication while influence of the inter-terminal In-band emission is reduced.

As is understood from the above explanation, the UE 1B according to this example embodiment can receive a discovery signal transmitted from the UE 1A, estimate a transmission power value of a transmission terminal of the discovery signal in accordance with a type of the discovery signal, and determine an inter-terminal path loss between wireless terminals by using the estimated transmission power value and the received power value of the discovery signal. Accordingly, the UE 1B according to this example embodiment can contribute to estimating an inter-terminal path loss between the UE 1A and the UE 1B without the need for receiving notification regarding a transmission power value of the UE 1A from the eNB 2.

Note that one of the cases where an estimation of the inter-terminal path loss according to this example embodiment is particularly effective is a case where transmission power control of a response signal of an inter-terminal path loss is performed when the response signal is transmitted in the direct discovery model B. Accordingly, an estimation of the inter-terminal path loss according to this example embodiment may be configured to be applied only when a direct discovery model is a model B.

Second Example Embodiment

A configuration example of a radio communication network according to this example embodiment is similar to that of the radio communication network according to the first example embodiment. In the first example embodiment, a method in which the UE 1B which has received a discovery request signal estimates an inter-terminal path loss when the direct discovery model B is used has been described. In contrast to this, a method in which the UE 1A which has received a discovery response signal estimates an inter-terminal path loss is described in the second example embodiment.

It is assumed in this example embodiment that a UE 1A functions as a remote terminal and a relay terminal is selected among a plurality of UEs 1 (UE 1B and UE 1C). In this case, as a relay terminal selection criterion, it is possible to select a UE 1 having a small inter-terminal path loss. The smaller the inter-terminal path loss is, the more a throughput (a throughput of the side link) of a D2D communication part at the time of a relay connection increases, and the UE1 is thus preferable as a relay terminal. Note that this relay terminal criterion is merely one example of such criterion, and a throughput of uplink communication of each of the UEs 1 which is a candidate of a relay terminal may be further taken into consideration.

As a method for enabling the UE 1A to recognize an inter-terminal path loss, Patent Literature 1 discloses that an inter-terminal path loss value estimated by the UE 1B which is a transmission terminal of a response signal is transmitted by being included in a response signal. However, a discovery response signal has a limited message size. Therefore, it is preferred that the UE 1A can recognize an inter-terminal path loss without adding an inter-terminal path loss value as new control information to the discovery response signal.

This example embodiment provides a method for estimating an inter-terminal path loss in the UE 1A, which solves the aforementioned problem.

Figure 6:
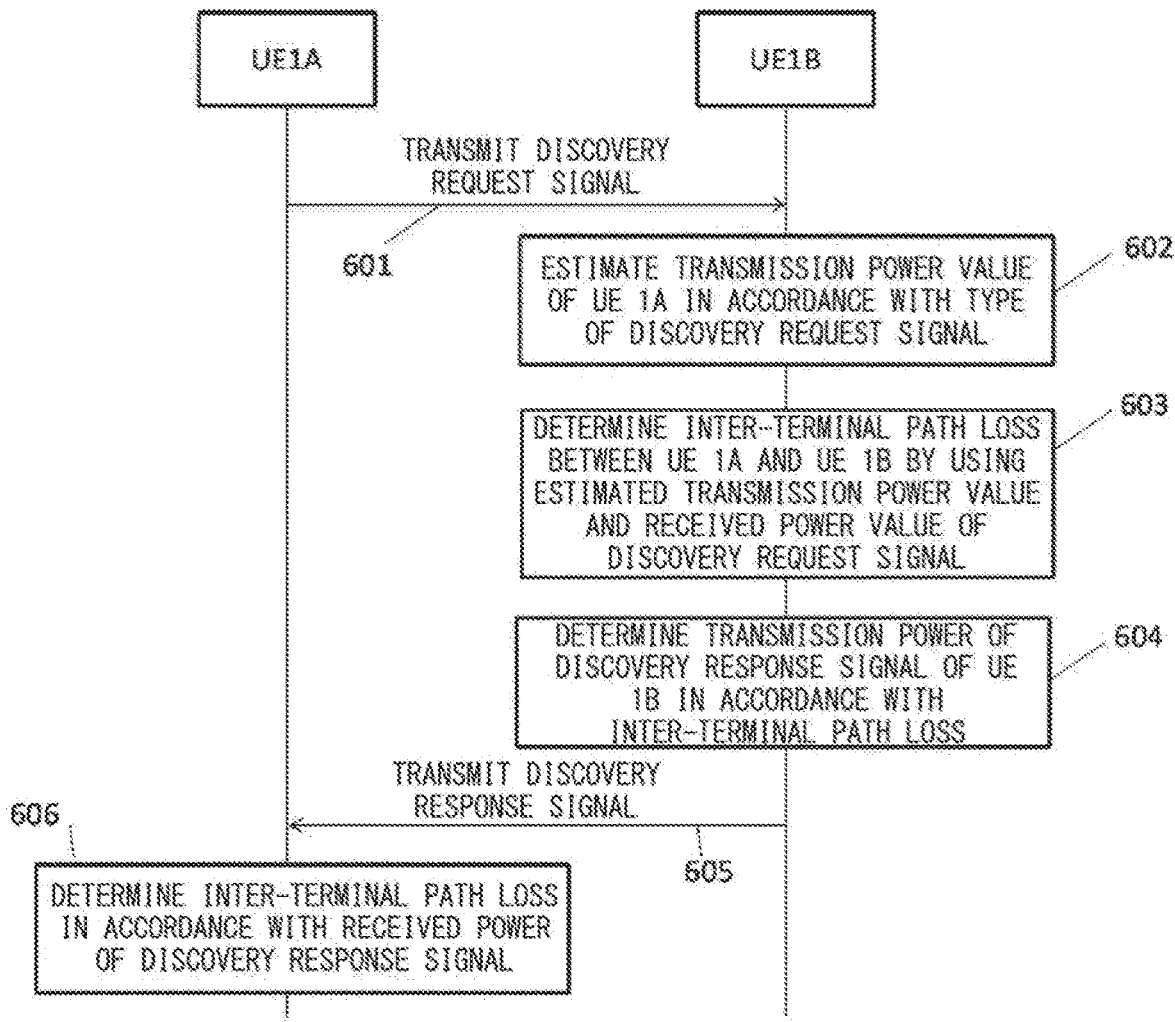
FIG. 6 is a sequence diagram showing one example of a procedure for determining an inter-terminal path loss by a terminal which receives a discovery response signal at the time of performing a direct discovery model B according to a second example embodiment.

FIG. 6 is a sequence diagram showing one example of a procedure for determining an inter-terminal path loss in the UE 1A at the time of performing the direct discovery model B. In Step 601, first, the UE 1A transmits a discovery request signal. Note that the UE 1A uses a transmission power value of the discovery signal for a non-specific UE based on Expression (1). In Step 602, next, the UE 1B which has received the discovery request signal estimates a transmission power value of the UE 1A using the above-described method in accordance with a message type of the discovery request signal. In Step 603, an inter-terminal path loss value between the UE 1A and the UE 1B is determined based on a difference value between the estimated transmission power value and the received power value of the discover request signal received by the UE 1B. In Step 604, the estimated inter-terminal path loss is used to determine a transmission power value of a discovery response signal by using Expression (2) or (3). Note that it is assumed hereinafter that Expression (2) is used as a transmission power value of the discovery response signal. In Step 605, the UE 1B transmits the discovery response signal. In Step 606, the UE 1A receives the discovery response signal and determines an inter-terminal path loss in accordance with this received power.

Next, a method for determining an inter-terminal path loss by the UE 1A which is a remote terminal is described. Transmission power of the UE 1B is determined according to Expression (2). This transmission power value is transmission power in accordance with the inter-terminal path loss of the second argument on the right side of Expression (2) when the terminals are not far apart from each other. When the correction coefficient α' is equal to 1, a discovery response signal based on this transmission power would be received by the UE 1B at target received power $P_O'$. On the other hand, when the correction coefficient α' is less than 1, the discovery response signal would be received at received power smaller than the target received power $P_O'$. Accordingly, a difference value between the target received power value $P_O'$ and the actual received power value $P_{Rx,Res,1A}$ corresponds to a ratio of (1-α') of the actual inter-terminal path loss. Thus, the UE 1A can determine an inter-terminal path loss by using Expression (4).

[Expression 4]

$$PL_{SL,1A} = \frac{1}{1-\alpha'}(P'_O - P_{Rx,Res,1A}) \qquad (4)$$

By using Expression (4) when the correction coefficient α' of which the value is less than 1 is used, the UE 1B which has received a discovery signal can recognize an inter-terminal path loss if an inter-terminal path loss value is not added to the discovery signal as control information.

Further, a method for improving an estimation accuracy of the inter-terminal path loss estimation method using Expression (4) in the case where a message type of the discovery request signal is the relay discovery for public safety applications is described. The UE 1B, which is a relay terminal, has assumed $P_{Tx,Sol,1A,Est}$ as a transmission power value of the discovery request signal of UE 1A when estimating an inter-terminal path loss. When a message type of the discovery request signal is relay discovery for public safety applications, $P_{Tx,Sol,1A,Est}$ which is an estimated transmission power value is $P_{Max}$ which is the maximum transmission power value of the terminal as a transmission power value of the discovery signal. In this case, when there is an error between the actual transmission power value $P_{Tx,Sol,1A}$ of the remote terminal UE 1A and the estimated transmission power value $P_{Tx,Sol,1A,Est}$, an error also develops in the path loss estimation of the UE 1A using Expression (4). On the other hand, the UE 1A can determine the actual transmission power $P_{Tx,Sol,1A}$ when the UE 1A has actually transmitted the discovery request signal. Further, the UE 1A also can determine the transmission power value $P_{Tx,Sol,1A,Est}$ used for estimating the inter-terminal path loss in the UE 1B from the message type of the transmitted discovery request signal. Therefore, an error ($P_{Tx,Sol,1A}-P_{Tx,Sol,1A,Est}$) of the transmission power value can be recognized in the UE 1A. In the UE 1A, correction according to this error of the transmission power value is made by using Expression (5).
[Expression 5]

$$PL'_{SL,1A}=PL_{SL,1A}-f(\alpha')(P_{Tx,Sol,1A}-P_{Tx,Sol,1A,Est}) \quad (5)$$

where $f(\alpha')$ is a function that the correction coefficient $\alpha'$ is used as a variable, and is a coefficient representing the degree of reflection of a transmission power error. Using Expression (5) makes it possible, when the UE 1B estimates an inter-terminal path loss without adding the inter-terminal path loss value to the response signal as the control information, to correct an error between the transmission power value of the UE 1B assumed by the transmission terminal UE 1A of the response signal and the actual transmission power value. That is, it is possible to estimate an inter-terminal path loss more accurately.

$f(\alpha')$ in Expression (5) is determined according to the correction coefficient $\alpha'$. Since $PL_{SL,1A}$ according to Expression (4) includes $1/(1-\alpha')$, influence of the transmission power error on Expression (4) increases when the correction coefficient $\alpha'$ is close to 1. Further, the inter-terminal path loss estimated value $PL_{SL,1B}$ of the relay terminal UE 1B which includes a transmission power error contributes to the transmission power (the second term on the right side of Expression (2)) of the discovery response signal by multiplying the correction coefficient $\alpha'$. Accordingly, an error of the transmission power value would be small when the correction coefficient $\alpha'$ is close to 0. Therefore, the following Expression can be used for $f(\alpha')$ as an example.

[Expression 6]

$$f(\alpha') = \frac{\alpha'}{1-\alpha'} \quad (6)$$

Using Expression (6) makes it possible, when the UE 1B estimates an inter-terminal path loss by using the received power of the discovery response signal, to correct an error between the transmission power value $P_{Tx,Sol,1A,Est}$ of the UE 1B assumed by the transmission terminal UE 1A of the discovery response signal and the actual transmission power value $P_{Tx,Sol,1A}$ while the influence of the correction coefficient $\alpha'$ of the transmission power control is taken into consideration. That is, it is possible to estimate an inter-terminal path loss more accurately.

Figure 7:
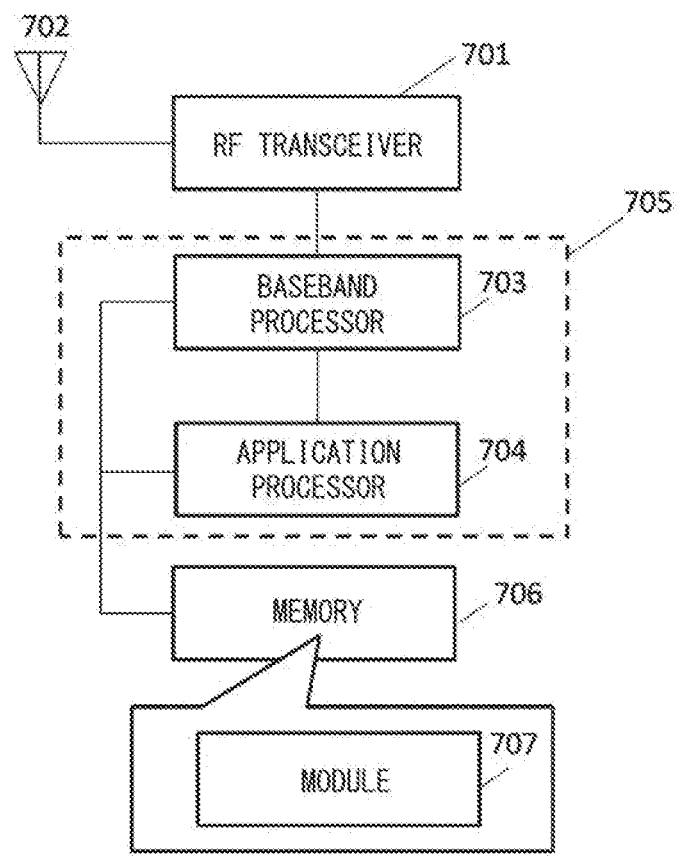
FIG. 7 is a block diagram showing a configuration example of a wireless terminal according to several example embodiments.

In the following, a configuration example of the UE 1 according to the above-described example embodiments is described. FIG. 7 is a block diagram showing the configuration example of the UE 1. A Radio Frequency (RF) transceiver 701 performs analog RF signal processing to communicate with the eNB 2. The analog RF signal processing performed by the RF transceiver 701 includes frequency up-conversion, frequency down-conversion, and amplification. The RF transceiver 701 is connected to an antenna 702 and a baseband processor 703. Specifically, the RF transceiver 701 receives modulated symbol data (or OFDM symbol data) from the baseband processor 703, generates a transmission RF signal and supplies the transmission RF signal to the antenna 702. Further, the RF transceiver 701 generates a baseband received signal based on a received RF signal received by the antenna 702 and supplies it to the baseband processor 703.

The RF transceiver 701 may also be used for sidelink communication with other UEs. The RF transceiver 701 may include a plurality of transceivers.

The baseband processor 703 performs digital baseband signal processing (i.e., data-plane processing) and control-plane processing for wireless communication. The digital baseband signal processing includes (a) data compression/decompression, (b) data segmentation/concatenation, (c) composition/decomposition of a transmission format (i.e., transmission frame), (d) channel encoding/decoding, (e) modulation (i.e., symbol mapping)/demodulation, and (f) OFDM symbol data (baseband OFDM signal) generation by Inverse Fast Fourier Transform (IFFT). Note that it may not include concatenation. On the other hand, the control-plane processing includes communication management of Layer 1 (e.g., transmission power control), Layer 2 (e.g., radio resource management and hybrid automatic repeat request (HARQ) processing), and Layer 3 (e.g., signaling regarding attach, mobility, and call management).

For example, in the case of LTE and LTE-Advanced, the digital baseband signal processing performed by the baseband processor 703 may include signal processing of Packet Data Convergence Protocol (PDCP) layer, Radio Link Control (RLC) layer, MAC layer, and PHY layer. Further, the control-plane processing performed by the baseband processor 703 may include processing of the Non-Access Stratum (NAS) protocol, RRC protocol, and MAC CEs.

The baseband processor 703 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 704, which is described below.

The application processor 704 is also referred to as a CPU, an MPU, a microprocessor or a processor core. The application processor 704 may include a plurality of processors (a plurality of processor cores). The application processor 704 loads a system software program (Operating System (OS)) and various application programs (e.g., voice call application, WEB browser, mailer, camera operation application, and music player application) from a memory 706 or from another memory (not shown) and executes these programs, thereby providing various functions of the UE 1.

In some implementations, as represented by a dashed line (705) in FIG. 7, the baseband processor 703 and the application processor 704 may be integrated on a single chip. In other words, the baseband processor 703 and the application processor 704 may be implemented in a single System on Chip (SoC) device 705. A SoC device may be referred to as a system Large Scale Integration (LSI) or a chipset.

The memory 706 is a volatile memory, a nonvolatile memory, or a combination thereof. The memory 706 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 706 may include, for example, an external memory device that can be accessed by the baseband processor 703, the application processor 704, and the SoC 705. The memory 706 may include an internal memory device that is integrated in the baseband processor 703, the application processor 704, or the SoC 705. Further, the memory 706 may include a memory in a Universal Integrated Circuit Card (UICC).

The memory 706 may store one or more software modules (or computer programs) 707 including instructions and data to perform processing by the UE 1 described in the above example embodiments. In some implementations, the baseband processor 703 or the application processor 704 may be configured to load the software modules 707 from the memory 706 and execute the loaded software modules, thereby performing the processing of the UE 1 described in the above example embodiments with reference to the drawings.

As described with reference to FIG. 7, each of the processors included in the UE 1 according to the above-described example embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Example Embodiments

Each of the above example embodiments may be used individually, or two or more of the example embodiments may be appropriately combined with one another.

The above example embodiments can be applied not only to D2D communication and direct discovery in ProSe as described in the examples above, but also to Vehicle-to-Everything (V2X) communication including Vehicle-to-Vehicle (V2V) communication, Vehicle-to-Infrastructure (V2I) communication, and Vehicle-to-Pedestrian (V2P) communication, which uses a framework similar to that of D2D communication and direct discovery in ProSe.

Further, although the above-described example embodiment has been described based on LTE-Advanced and LTE-Advanced Pro, it can also be applied to, for example, a 5G core network (5G-CN) or a base station (gNB) of a 5G radio access network (5G-RAN) using 5G radio access (New Radio).

Furthermore, the above-described example embodiments are merely examples of application of the technical ideas obtained by the present inventor. Needless to say, these technical ideas are not limited to those described in the above example embodiments and may be changed in various ways.

For example, the whole or part of the example embodiments disclosed above can be described as, but not limited to, the following Supplementary Notes.

Supplementary Note A1

A wireless terminal comprising:
at least one memory;
at least one processor coupled to the at least one memory; and
an RF transceiver, wherein
the at least one processor is configured to:
receive a discovery signal of device-to-device (D2D) direct discovery transmitted from a first wireless terminal;
estimate a transmission power estimated value of the discovery signal in accordance with a message type of the discovery signal; and
determine an inter-terminal path loss between the first wireless terminal and the own terminal by using the transmission power estimated value and the received power value of the discovery signal.

Supplementary Note A2

The wireless terminal described in Supplementary note A1, wherein
when the message type of the discovery signal is a message (UE-to-Network Relay Discovery) related to a relay connection for public safety applications,
one of: the maximum transmission power value of the terminal determined for each frequency band; the maximum transmission power value of the terminal broadcast from a base station; and the maximum transmission power value stored in a memory of the own terminal and used when the own terminal is located out of range is used as the transmission power estimated value.

Supplementary Note A3

The wireless terminal described in Supplementary note A1 or A2, wherein
when the message type of the discovery signal is a message related to a relay connection for non public safety applications, a transmission power value when the own terminal transmits a discovery signal of the same type as that of the discovery signal is used as the transmission power estimated value.

Supplementary Note A4

The wireless terminal described in any one of Supplementary notes A1 to A3, wherein the discovery signal is a discovery request signal.

Supplementary Note A5

The wireless terminal described in any one of Supplementary notes A1 to A4, wherein
the D2D direct discovery is performed by:
transmitting, by a discoverer wireless terminal, a discovery request signal; and
transmitting, by one or more discoveree wireless terminals, a discovery response signal in response to receiving the discovery request signal.

Supplementary Note A6

The wireless terminal described in Supplementary note A5, wherein a transmission power value of the discovery response signal is determined based on the inter-terminal path loss.

Supplementary Note A7

The wireless terminal described in Supplementary note A6, wherein the transmission power value of the discovery response signal is determined while a transmission power value when the own terminal transmits a discovery request signal is set as an upper limit.

Supplementary Note B1

A wireless terminal comprising:
at least one memory;
at least one processor coupled to the at least one memory; and
an RF transceiver, wherein
the at least one processor is configured to:
transmit a discovery request signal of device-to-device (D2D) direct discovery to a first wireless terminal;
receive a discovery response signal of the device-to-device (D2D) direct discovery transmitted from the first wireless terminal; and
determine an inter-terminal path loss based on a received power difference value between the received power value of the discovery response signal and a target received power value used for transmission power control of the discovery response signal.

Supplementary Note B2

The wireless terminal described in Supplementary note B1, wherein the inter-terminal path loss is determined by making a correction for the received power difference value based on a path-loss correction coefficient in the transmission power control.

Supplementary Note B3

The wireless terminal described in Supplementary note B1 or B2, wherein a transmission power value of the discovery response signal is determined based on a transmission power estimated value of the discovery request signal estimated in accordance with a message type of the discovery request signal.

Supplementary Note B4

The wireless terminal described in Supplementary note B3, wherein the inter-terminal path loss is corrected based on a transmission power error between the transmission power estimated value and the actual transmission power value of the discovery request signal.

Supplementary Note B5

The wireless terminal described in Supplementary note B4, wherein the correction is made for the transmission power error based on the path-loss correction coefficient in the transmission power control.

Supplementary Note C1

A wireless communication system comprising:
a first wireless terminal; and
at least one second wireless terminal, wherein
the first wireless terminal transmits a discovery signal of device-to-device (D2D) direct discovery to the second wireless terminal,
the second wireless terminal receives the discovery signal, estimates a transmission power estimated value of the discovery signal in accordance with a message type of the discovery signal, and determines an inter-terminal path loss between the first wireless terminal and the own terminal by using the transmission power estimated value and the received power value of the discovery signal.

Supplementary Note C2

The wireless communication system described in Supplementary note C1, wherein
when the message type of the discovery signal is a message (UE-to-Network Relay Discovery) related to a relay connection for public safety applications,
as the transmission power estimated value, the second wireless terminal further uses one of: the maximum transmission power value of the terminal determined for each frequency band; the maximum transmission power value of the terminal broadcast from a base station; and the maximum transmission power value stored in a memory of the own terminal and used when the own terminal is located out of range.

Supplementary Note C3

The wireless communication system described in Supplementary note C1 or C2, wherein
when a message type of the discovery signal is a message related to a relay connection for non public safety applications,
as the transmission power estimated value, the second wireless terminal further uses a transmission power value when the own terminal transmits a discovery signal of the same type as that of the discovery signal.

Supplementary Note C4

The wireless communication system described in any one of Supplementary notes C1 to C3, wherein the discovery signal is a discovery request signal.

Supplementary Note C5

The wireless communication system described in any one of Supplementary notes C1 to C4, wherein
the D2D direct discovery is performed by:
having a discoverer wireless terminal transmit a discovery request signal; and
having one or more discoveree wireless terminals transmit a discovery response signal in response to receiving the discovery request signal.

Supplementary Note C6

The wireless communication system described in Supplementary note C5, wherein the second wireless terminal further determines a transmission power value of the discovery response signal based on the inter-terminal path loss.

Supplementary Note C7

The wireless communication system described in Supplementary note C6, wherein the second wireless terminal further determines the transmission power value of the discovery response signal while a transmission power value when the second wireless terminal transmits the discovery request signal is set as an upper limit.

Supplementary Note C8

The wireless communication system described in any one of Supplementary notes C5 to C7, wherein the first wireless terminal further determines an inter-terminal path loss based on a received power difference value between the received power value of the discovery response signal and a target received power value used for transmission power control of the discovery response signal.

Supplementary Note C9

The wireless communication system described in Supplementary note C8, wherein the first wireless terminal further determines the inter-terminal path loss by making a correction for the received power difference value based on a path-loss correction coefficient in the transmission power control.

Supplementary Note C10

The wireless communication system described in any one of Supplementary notes C2 to C9, wherein the first wireless terminal further corrects the inter-terminal path loss based on a transmission power error between the transmission power estimated value and the actual transmission power value of the discovery request signal.

Supplementary Note C11

The wireless communication system described in Supplementary note C10, wherein the first wireless terminal further makes a correction for the transmission power error based on the path-loss correction coefficient in the transmission power control to correct the inter-terminal path loss.

Supplementary Note a1

A method performed by a wireless terminal, the method comprising:
receiving a discovery signal of device-to-device (D2D) direct discovery transmitted from a first wireless terminal;
estimating a transmission power estimated value of the discovery signal in accordance with a message type of the discovery signal; and
determining an inter-terminal path loss between the first wireless terminal and the own terminal by using the transmission power estimated value and the received power value of the discovery signal.

Supplementary Note a2

The method described in Supplementary note a1, further comprising using,
when the message type of the discovery signal is a message (UE-to-Network Relay Discovery) related to a relay connection for public safety applications,
as the transmission power estimated value, one of: the maximum transmission power value of the terminal determined for each frequency band; the maximum transmission power value of the terminal broadcast from a base station; and the maximum transmission power value stored in a memory of the own terminal and used when the own terminal is located out of range.

Supplementary Note a3

The method described in Supplementary note a1 or a2, further comprising using, when a message type of the discovery signal is a message related to a relay connection for non public safety applications, a transmission power value when the own terminal transmits a discovery signal of the same type as that of the discovery signal as the transmission power estimated value.

Supplementary Note a4

The method described in any one of Supplementary notes a1 to a3, wherein the discovery signal is a discovery request signal.

Supplementary Note a5

The method described in any one of Supplementary notes a1 to a4, wherein the D2D direct discovery comprises:
transmitting, by a discoverer wireless terminal, a discovery request signal; and
transmitting, by one or more discoveree wireless terminals, a discovery response signal in response to receiving the discovery request signal.

Supplementary Note a6

The method described in Supplementary note a5, further comprising determining a transmission power value of the discovery response signal based on the inter-terminal path loss.

Supplementary Note a7

The method described in Supplementary note a6, further comprising determining the transmission power value of the discovery response signal while a transmission power value when the own terminal transmits a discovery request signal is set as an upper limit.

Supplementary Note b1

A method performed by a wireless terminal, the method comprising:
transmitting a discovery request signal of device-to-device (D2D) direct discovery to a first wireless terminal;
receiving a discovery response signal of the device-to-device (D2D) direct discovery transmitted from the first wireless terminal; and
determining an inter-terminal path loss based on a received power difference value between the received power value of the discovery response signal and a target received power value used for transmission power control of the discovery response signal.

Supplementary Note b2

The method described in Supplementary note b1, further comprising determining the inter-terminal path loss by making a correction for the received power difference value based on a path-loss correction coefficient in the transmission power control.

Supplementary Note b3

The method described in Supplementary note b1 or b2, further comprising determining a transmission power value of the discovery response signal based on a transmission power estimated value of the discovery request signal estimated in accordance with a message type of the discovery request signal.

Supplementary Note b4

The method described in Supplementary note b3, further comprising correcting the inter-terminal path loss based on a transmission power error between the transmission power estimated value and the actual transmission power value of the discovery request signal.

Supplementary Note b5

The method described in Supplementary note b4, further comprising making the correction for the transmission power error based on the path-loss correction coefficient in the transmission power control.

Supplementary Note d1

A program for causing a computer to perform a method described in any one of Supplementary notes a1 to a7.

Supplementary Note d2

A program for causing a computer to perform a method described in any one of Supplementary notes b1 to b5.

This application is based upon and claims the benefit of priority from Japanese patent application No. 2016-252660, filed on Dec. 27, 2016, the disclosure of which is incorporated herein in its entirety by reference.

REFERENCE SIGNS LIST

1 WIRELESS TERMINAL (UE)
2 BASE STATION (eNB)
3 CORE NETWORK
4 D2D CONTROLLER
701 RADIO FREQUENCY (RF) TRANSCEIVER
702 ANTENNA
703 BASEBAND PROCESSOR
704 APPLICATION PROCESSOR
706 MEMORY

What is claimed is:

1. A wireless terminal comprising:
at least one memory;
at least one processor coupled to the at least one memory; and
an RF transceiver, wherein the at least one processor is configured to:
receive a discovery signal of device-to-device (D2D) direct discovery transmitted from a first wireless terminal;
estimate a transmission power estimated value of the discovery signal in accordance with a message type of the discovery signal; and
determine an inter-terminal path loss between the first wireless terminal and the own terminal by using the transmission power estimated value and a received power value of the discovery signal,
wherein the D2D direct discovery is performed by:
transmitting, by a discoverer wireless terminal, a discovery request signal; and
transmitting, by one or more discoveree wireless terminals, a discovery response signal in response to receiving the discovery request signal,
wherein a transmission power value of the discovery response signal is determined based on the inter-terminal path loss, and
wherein the transmission power value of the discovery response signal is determined while a transmission power value when the own terminal transmits a discovery request signal is set as an upper limit.

2. The wireless terminal according to claim 1, wherein when the message type of the discovery signal is a message (UE-to-Network Relay Discovery) related to a relay connection for public safety applications,
one of: a maximum transmission power value of the first wireless terminal determined for each frequency band; the maximum transmission power value of the first wireless terminal broadcast from a base station; and the maximum transmission power value stored in the memory of the own terminal and used when the own terminal is located out of range is used as the transmission power estimated value.

3. The wireless terminal according to claim 1, wherein when the message type of the discovery signal is a message related to a relay connection for non public safety applications, a transmission power value when the own terminal transmits a discovery signal of the same type as that of the discovery signal is used as the transmission power estimated value.

4. The wireless terminal according to claim 1, wherein the discovery signal is a discovery request signal.

5. A method performed by a wireless terminal, the method comprising:
receiving a discovery signal of device-to-device (D2D) direct discovery transmitted from a first wireless terminal;
estimating a transmission power estimated value of the discovery signal in accordance with a message type of the discovery signal; and
determining an inter-terminal path loss between the first wireless terminal and the own terminal by using the transmission power estimated value and a received power value of the discovery signal,
wherein the D2D direct discovery comprises:
transmitting, by a discoverer wireless terminal, a discovery request signal; and
transmitting, by one or more discoveree wireless terminals, a discovery response signal in response to receiving the discovery request signal,
said method further comprising determining a transmission power value of the discovery response signal based on the inter-terminal path loss, and
said method further comprising determining the transmission power value of the discovery response signal while a transmission power value when the own terminal transmits a discovery request signal is set as an upper limit.

6. The method according to claim 5, further comprising using, when the message type of the discovery signal is a message (UE-to-Network Relay Discovery) related to a relay connection for public safety applications,
as the transmission power estimated value, one of: a maximum transmission power value of the first wireless terminal determined for each frequency band; the maximum transmission power value of the first wireless terminal broadcast from a base station; and the maximum transmission power value stored in a memory of the own terminal and used when the own terminal is located out of range.

7. The method according to claim 5, further comprising using, when a message type of the discovery signal is a message related to a relay connection for non public safety applications, a transmission power value when the own terminal transmits a discovery signal of the same type as that of the discovery signal as the transmission power estimated value.

8. The method according to claim 5, wherein the discovery signal is a discovery request signal.

9. A non-transitory computer readable medium storing a program for controlling an operation of a wireless terminal, the program causing a computer to:

receive a discovery signal of device-to-device (D2D) direct discovery transmitted from a first wireless terminal;

estimate a transmission power estimated value of the discovery signal in accordance with a message type of the discovery signal; and determine an inter-terminal path loss between the first wireless terminal and the own terminal by using the transmission power estimated value and a received power value of the discovery signal, wherein the D2D direct discovery is performed by:

transmitting, by a discoverer wireless terminal, a discovery request signal; and transmitting, by one or more discoveree wireless terminals, a discovery response signal in response to receiving the discovery request signal, wherein a transmission power value of the discovery response signal is determined based on the inter-terminal path loss, and wherein the transmission power value of the discovery response signal is determined while a transmission power value when the own terminal transmits a discovery request signal is set as an upper limit.

* * * * *